June 12, 1928.

W. J. DE REAMER 1,672,931

MACHINE FOR MANUFACTURING PULP PRODUCTS

Filed July 16, 1925 6 Sheets-Sheet 4

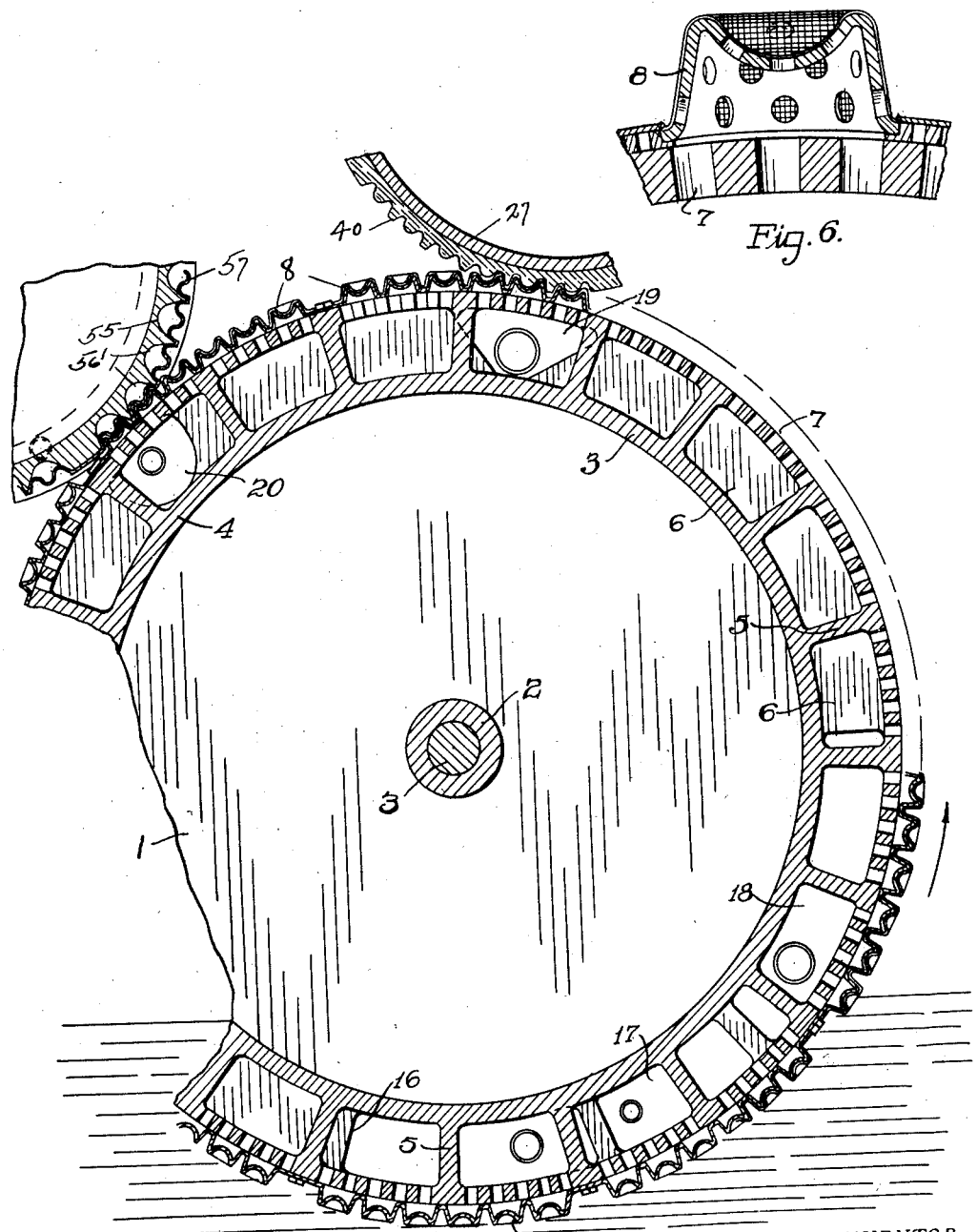

June 12, 1928.

W. J. DE REAMER 1,672,931

MACHINE FOR MANUFACTURING PULP PRODUCTS

Filed July 16, 1925

INVENTOR
William De Reamer
BY
ATTORNEY

Patented June 12, 1928.

1,672,931

UNITED STATES PATENT OFFICE.

WILLIAM J. DE REAMER, OF CROWN POINT, INDIANA, ASSIGNOR, BY MESNE ASSIGNMENTS, TO MAPES CONSOLIDATED MANUFACTURING COMPANY, OF GRIFFITH, INDIANA, A CORPORATION OF DELAWARE.

MACHINE FOR MANUFACTURING PULP PRODUCTS.

Application filed July 16, 1925. Serial No. 44,026.

This invention relates to a method of and machine for the manufacture of pulp products, it particularly relating to the manufacture of the "flats" of egg case fillers.

One of the objects of the invention is to improve the machine and method of manufacture described in Letters Patent 1,211,229, dated Jan. 2, 1917.

Another and more specific object of the invention is to provide an improved method and means for eliminating moisture from the molded product.

A further object of the invention is to provide a method and means for imparting a smooth finish to the molded product.

A further object of the invention is to provide an arrangement whereby the suction pockets as well as the orifices of the mold elements communicating with the pockets of the transfer drum may be subjected to the cleansing action of a stream of water.

Further objects of the invention will appear from the accompanying description and claims.

In the drawings:

Fig. 5 is a section on the line 5—5 of Fig. 4.

Fig. 6 is a section of one of the molds.

In the machine of the patent referred to there is employed a molding drum which revolves through a pulp tank with provision for sucking the pulp onto the periphery of the drum, the periphery being suitably formed with mold surfaces to impart the desired shape to the product. In connection with this molding drum, provision was made for subjecting the molded product to a suction action for the purpose of relieving it so far as possible of moisture, after which the molded product was transferred to another drum known as the transfer drum through the medium of a combined air suction and air pressure action. From the transfer drum the molded product was conveyed to suitable drying devices.

While the results secured from the machine of the patent were good, yet it was found desirable to eliminate more of the moisture in the molded product than was removed by the suction action referred to in order that the action of the drying apparatus might be hastened. It was also found desirable to impart to the outer surface of the molded product a smooth finish. To that end I have in the present machine devised a method and means in the form of a wringer roll which not only acts in conjunction with a suction to eliminate the moisture to a greater extent than could be accomplished by the machine of the patent, but also serves to smooth the surface of the molded product by pressing into the body of the product adhering particles of pulp, which not only imparts a better appearance to the finished product, but also prevents the smaller particles of pulp from clogging the small perforations of the surface of the transfer drum to any appreciable extent.

Figure 1:
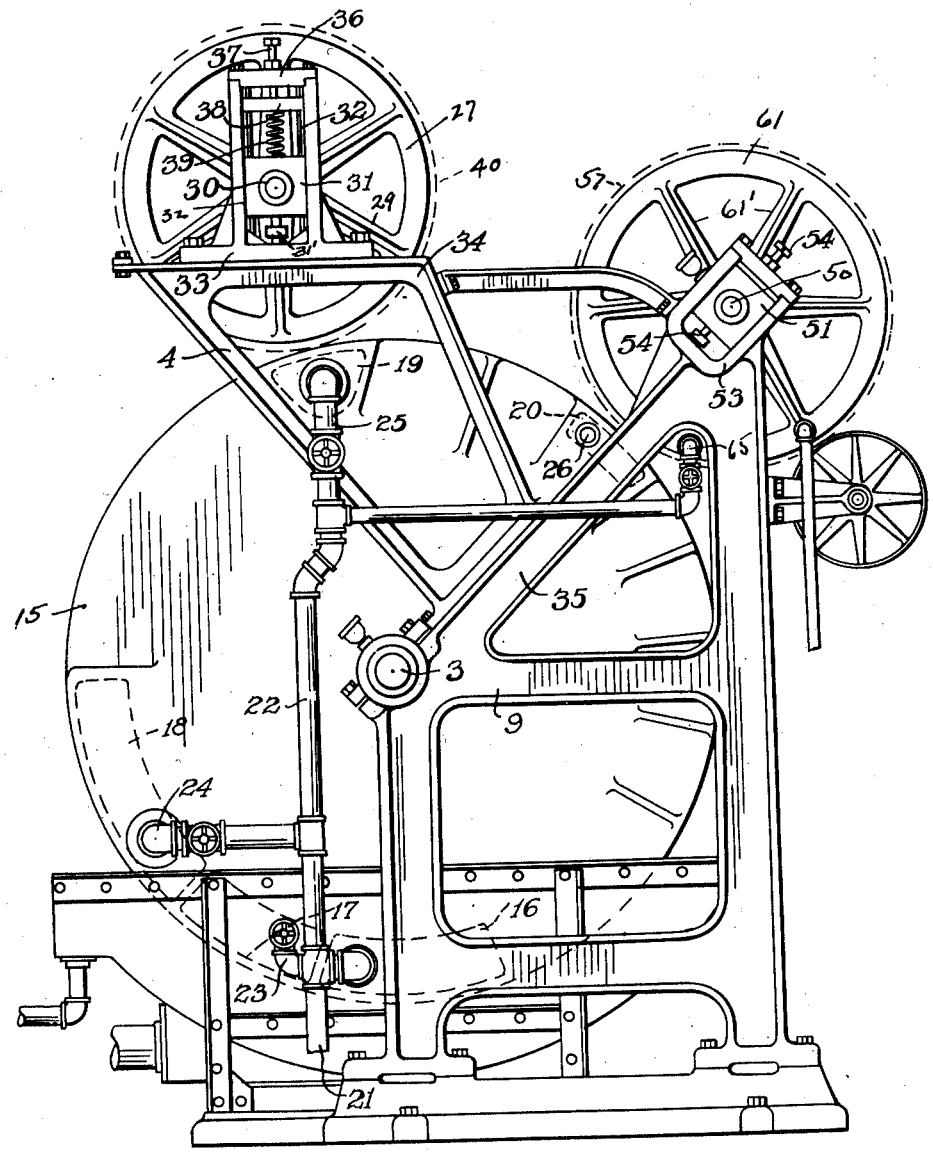
Fig. 1 is a side elevation of an apparatus embodying the improvements.
Figure 2:
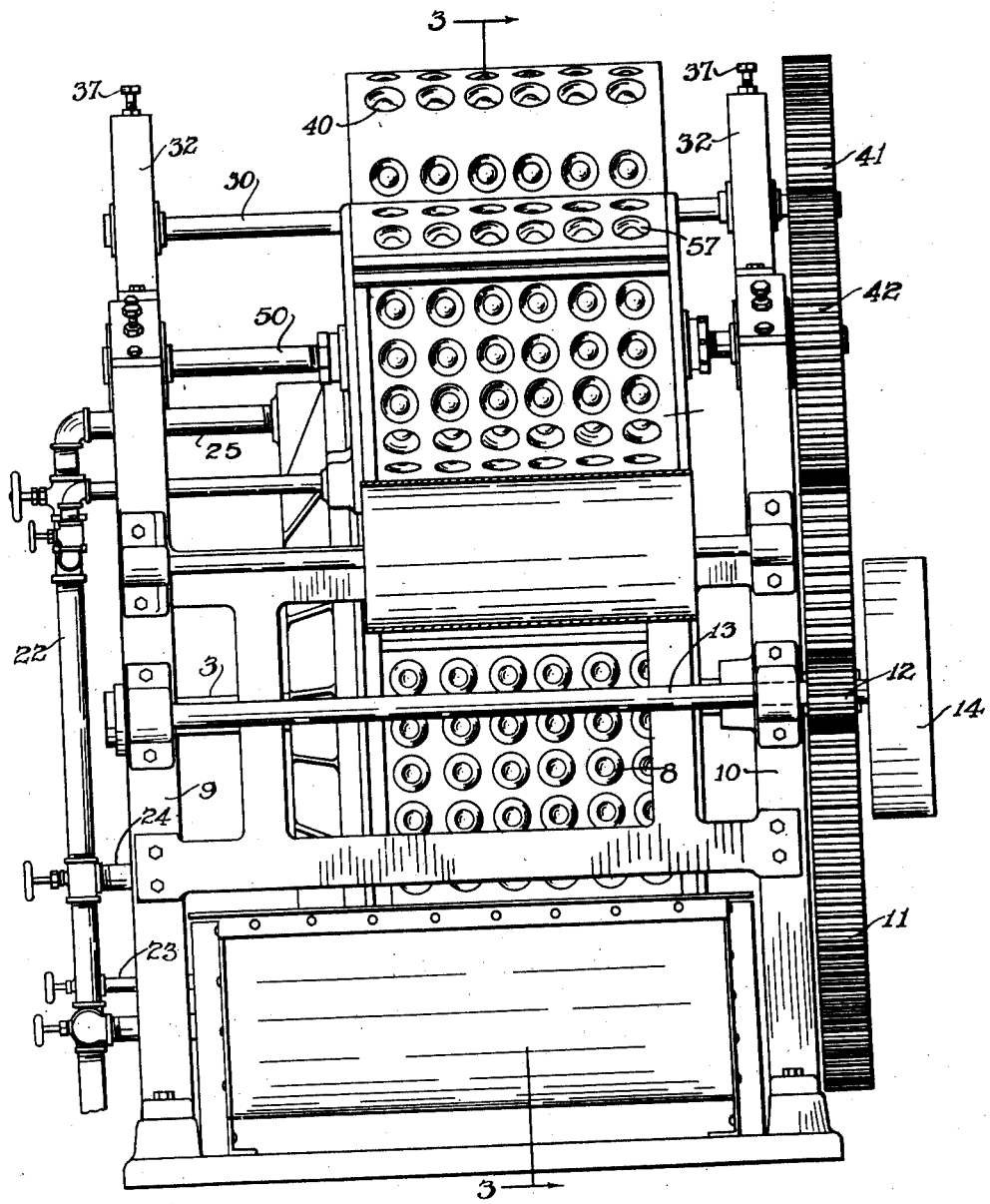
Fig. 2 is a front elevation of the same.
Figure 3:
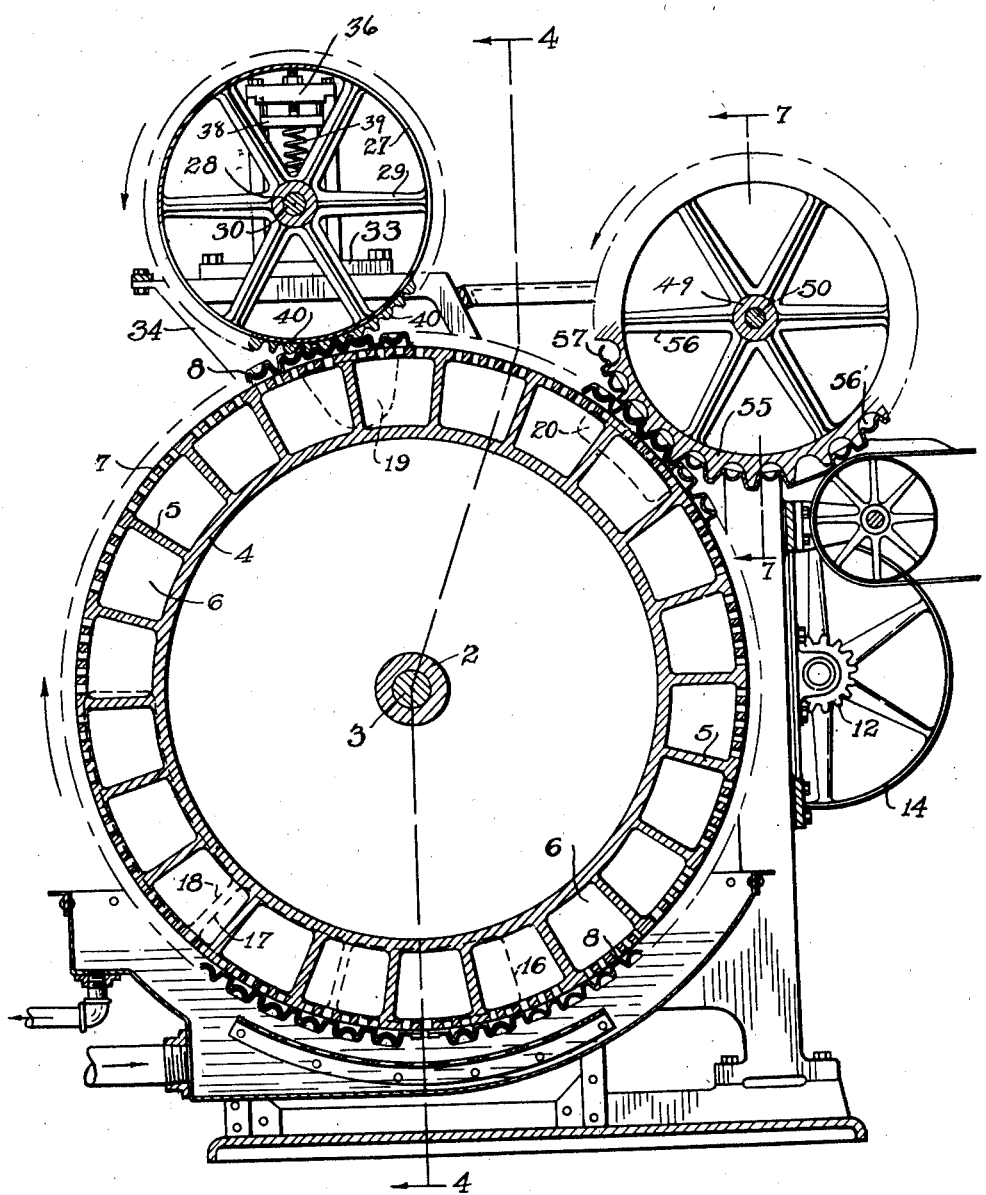
Fig. 3 is a section on the line 3—3 of Fig. 2.
Figure 4:
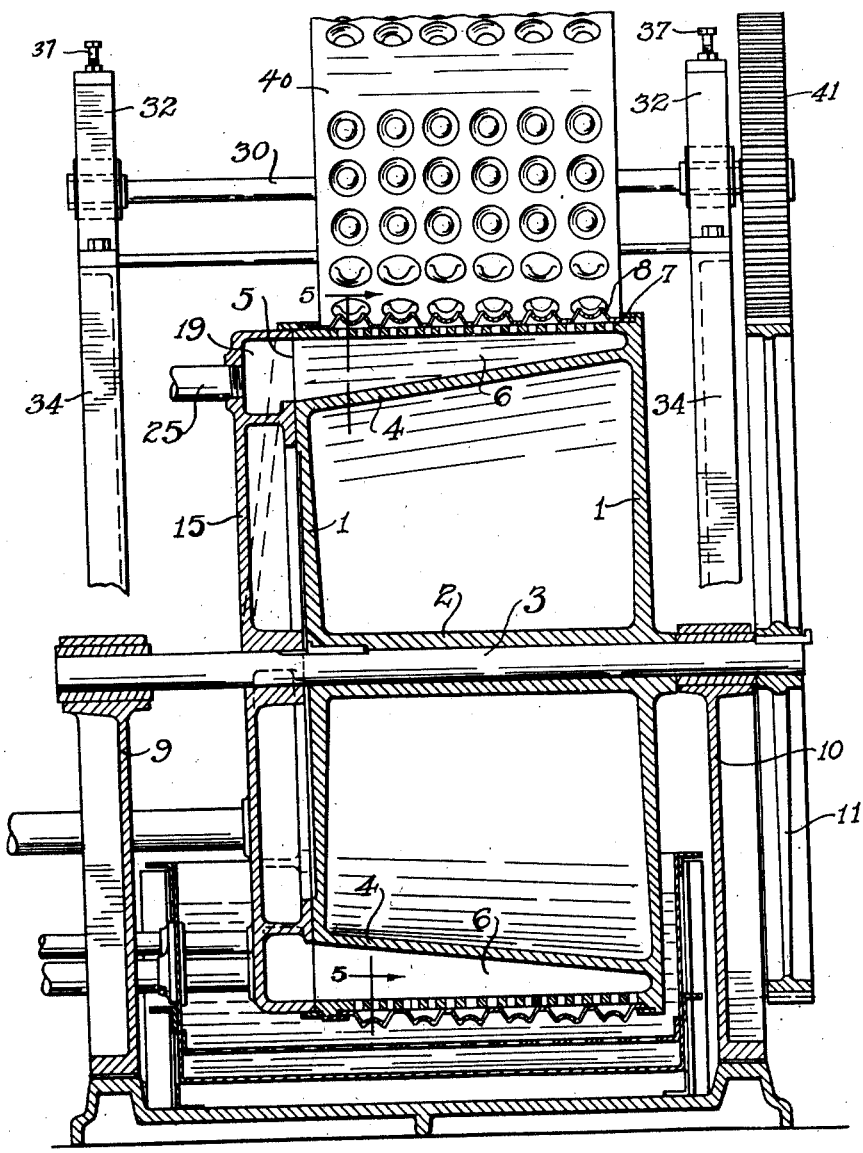
Fig. 4 is a section on the line 4—4 of Fig. 3.
Figure 7:
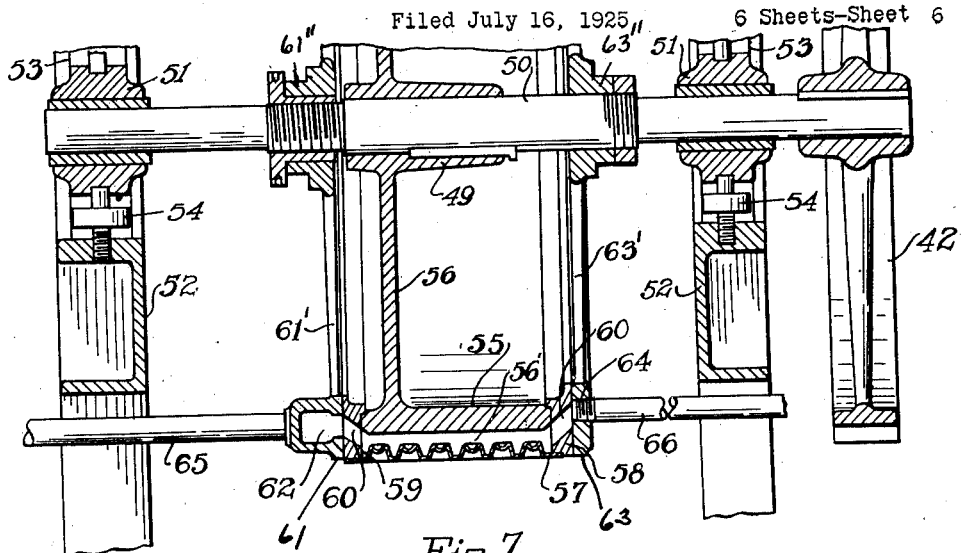
Fig. 7 is a section of a portion of the transfer drum on the line 7—7 of Fig. 3.
Figure 8:
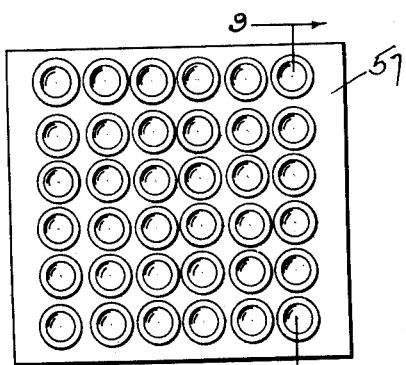
Fig. 8 is a plan view of the molded product.
Figure 9:
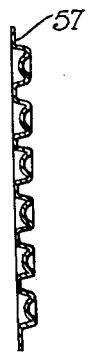
Fig. 9 is a section on the line 9—9 of Fig. 8.

In the drawings, 1 represents the webs of the molding drum, these webs being united to an inner hub 2 journaled on the shaft 3 and also to an inclined inner rim 4 having a series of radially extending walls 5 united by outer peripheral walls 7 to form pockets or chambers 6. The walls 7 have fastened thereto suitably formed mold sections 8 in a manner substantially as described in the patent referred to. The molding drum is keyed to the shaft 3, which is journaled in suitable bearings at the upper end of frame standards 9 and 10 and has a gear 11 driven by the pinion 12 on the drive shaft 13. This shaft 13 is shown in the present case equipped with a belt pulley 14 to receive motion from any suitable source of power. A stationary head 15 is located adjacent one end of the molding drum and is formed with a series of suction chambers 16, 17, 18 and 19 and an air pressure chamber 20, the general disposition of which is shown in dotted lines in Fig. 1. All of these chambers except the one 19 correspond in function to the chambers described in the former patent. A main suction pipe 21 communicates with the respective suction chambers through the branch pipes 22, 23, 24 and 25, and communicating with the air pressure chamber 20 is a pipe 26 for furnishing a supply of air under pressure to said chamber. As the molding drum rotates through the tank the pulp is sucked upon the molded surfaces as the pockets 6 thereof come in registry with the chamber 16. The pulp product is held upon the molded surfaces by a comparatively heavy suction created in the chamber 17 which has a much lighter suction than that in the chamber 16. The suction created in the chamber 18, which is a heavy suction, acts to eliminate moisture from the molded product after it leaves the tank.

While the action of this latter suction chamber is effective for eliminating a greater portion of the moisture, yet it is found that a considerable quantity of moisture still remains which it is desirable to eliminate so far as possible before the molded product is transferred to the transfer drum and thence to the carrier which conveys the product to the drying appartus. To that end I have provided in the present machine a wringer roll or cylinder which cooperates with the molding drum to squeeze or wring the molded product and in connection with said squeezing or wringing action I have also provided a suction to carry away the moisture eliminated thereby. The wringing roller consists of a cylidrical body 27 united to a hub 28 by the spokes 29. The hub is journaled upon a shaft 30 and each end of the shaft is supported in a block 31 slidably mounted in guides 32; 31' representing an adjustable screw which forms a stop for the block. The lower ends of these guides are connected with a base 33 which is secured to a bracket 34 supported by the frame member 35. The upper ends of the guides 32 are connected by a cross-bar 36 which has threaded therein a screw 37 which bears upon a spring follower 38; a coil spring 39 being interposed between the follower 38 and the block 31. By this arrangement the wringing cylinder is held in spring pressed relation with the molding drum. The periphery of the cylinder 27 is covered with a soft rubber surface 40 the outer face of which is shaped to conform to the molds 8 of the molding drum. The shaft 30 of the wringing cylinder has a gear 41 which is driven from the gear 11. The suction chamber 19 in the stationary head is so positioned as to register with the pockets 6 at the point where the wringing or squeezing action between the molding drum and wringer roller takes place.

The hub 49 of the transfer drum is keyed to the shaft 50 to which the gear 42 is connected, this shaft being supported in bearings 51 adjustably mounted on the frame parts 52; these bearings being slidably mounted in guides 53 and held in proper adjusted position by the screws 54. The rim 55 on the transfer drum is connected to the hub by the webs or spokes 56 and has its periphery provided with transverse ribs to form pockets 56', the pockets being covered by a series of perforated plates 57 shaped to conform to the mold sections on the transfer drum in the manner described in the prior patent. The rim 55 has secured to each edge thereof a brass ring indicated at 58 and 59, these rings having ports 60 which communicate with the pockets 56'. A stationary ring 61 having a suction chamber 62 is positioned adjacent the ring 59 and another stationary ring 63 having a water chamber 64 is positioned adjacent the ring 58; the water chamber being in longitudinal alignment with the air suction chamber. Each of these rings is connected through spokes 61' 63' with hubs 61" 63" loosely mounted on the shaft 50. The air suction pipe 65 connects with the chamber 62 and a water pipe 66 connects with the chamber 64. The transfer of the molded product from the molding drum to the transfer drum is accomplished by air suction applied to the pockets 56 as they are brought in registry with the chamber 62 in connection with an air pressure applied to the pockets 6 in the molding drum as they are brought in registry with the air pressure chamber 20 in the head 15 substantially in the manner described in the former patent referred to. By having the additional head or stationary ring 63 which closes the ports 60 in all the pockets excepting the one registering with the small water chamber 64 provision is made for sending a stream of water through the pockets 56 for cleansing purposes; the pipe 66 having a suitable valve not shown which is closed during the ordinary operation of the machine.

Having thus described my invention, I claim:

1. In a machine of the character described, a drum having a perforated molding surface, air suction means associated with the drum for depositing saturated pulp on said surface, a spring-pressed wringer roll having a corresponding molding surface co-operating with the surface of said drum to apply pressure to said product, suction means associated with said drum and co-operating with said wringer roll to eliminate moisture from said product, and devices for thereafter transferring the molded product from said drum.

2. In a machine of the character described, a molding drum having a molding surface, means for depositing saturated pulp thereon, a spring pressed wringer roller having a soft outer surface cooperating with the mold surface of said drum to compress the product to eliminate moisture, and devices for thereafter transferring the molded product from said drum.

3. In a machine of the character described, a drum having a perforated molding surface together with means for depositing saturated pulp thereon, a spring-pressed wringer roll having a soft outer surface cooperating with said mold surface to compress the product, suction means associated with said drum and cooperating with the wringer roll to eliminate moisture from said product, and devices for thereafter transferring the molded product from said drum.

4. In a machine of the character described, a drum having a perforated molding surface together with suction means for depositing saturated pulp thereon, a spring pressed wringer roll having a soft surface corresponding to the mold surface of said drum and cooperating therewith, additional suction means associated with said drum and cooperating with said wringer roller to eliminate moisture from said product, and a transfer drum, together with air pressure, and suction means associated with said molding drum and transfer drum for transferring the product.

5. In a machine of the character described, a drum having a perforated outer molding surface, and a series of longitudinally extending pockets communicating with the perforations of said molding surface, a stationary head associated with one end of said drum having a suction chamber coacting with said pockets to cause saturated pulp to be deposited on said molding surface, a spring pressed wringer roll coacting with said molding surface to compress the pulp, said head having another suction chamber which communicates with said pockets as the molding surfaces associated with the pockets come in contact with said wringer roll, and devices for thereafter transferring the molded product from said drum.

6. In a machine of the character described, a drum having a perforated surface and a series of longitudinal pockets communicating with the perforations of said pockets, each end of each of said pockets having an opening, a stationary head at one end of said drum having an air suction chamber adapted to communicate with one end of said pockets, and a second head at the other end of said pockets provided with a means of water supply to communicate with the other ends of said pockets.

7. In a machine of the character described, a drum having a perforated outer surface and a series of inner longitudinally extending pockets communicating with said perforations, each pocket having an opening at each end, a stationary head at one end of said drum having a plurality of air suction chambers adapted to be brought in registry with said pockets as the drum revolves, and a second stationary head at the opposite end of said drum to form a closure for the openings of said pockets at that end of the drum and provided with water supply means in longitudinal alignment with one of the suction chambers of the other head.

8. In a machine of the character described, a drum having a perforated molding surface, air suction means associated with the drum for depositing saturated pulp on said surface, a yieldable pressure roll having a corresponding molding surface cooperating with the surface of said drum to apply pressure to said product, suction means associated with said drum and cooperating with said wringer roll to eliminate moisture from said product at the point of contact between the surfaces of said drum and roll, and devices for thereafter transferring the molded product from said drum.

In testimony whereof, I have hereunto set my hand this 1st day of July, 1925.

WILLIAM J. DE REAMER.